United States Patent [19]

Schulze

[11] 3,995,297
[45] Nov. 30, 1976

[54] FILM CASSETTE
[75] Inventor: Heinz Schulze, Dresden, Germany
[73] Assignee: VEB Pentacon Dresden, Germany
[22] Filed: Aug. 25, 1975
[21] Appl. No.: 607,531

[52] U.S. Cl. .............................. 354/275; 352/78 R
[51] Int. Cl.² ......................................... G03B 17/26
[58] Field of Search ................. 352/77, 78 R, 78 C;
354/275, 21, 204, 212, 213, 206

[56] References Cited
UNITED STATES PATENTS

| | | | |
|---|---|---|---|
| 2,674,166 | 4/1954 | Sochor | 354/204 |
| 3,444,795 | 5/1969 | Nerwin | 352/78 R |
| 3,846,813 | 11/1974 | Oshima | 354/275 X |

Primary Examiner—John Gonzales
Attorney, Agent, or Firm—William Anthony Drucker

[57] ABSTRACT

The film cassette comprising the usual delivery chamber and take-up chamber for a film provided with a feed perforation and a bridge which connects the two chambers. A feed slot in said bridge extends in the travel direction of the film, a lateral edge of the feed slot having an offset in the end of the slot directed towards the take-up chamber. In this manner, the feed claw of the camera has to perform a lateral movement to effect unlocking of the shutter release mechanism or locking of a further cocking and film transport operation.

4 Claims, 3 Drawing Figures

FILM CASSETTE

BACKGROUND TO THE INVENTION

The invention relates to a film cassette comprising a delivery chamber and a take-up chamber for a film provided with a feed perforation as well as comprising a bridge which connects the two chambers and in which a feed slot extends in the travel direction of the film.

In known cassettes, there is provided in the bridge, on the surface directed towards the film, a feed depression, which allows the feeding claw to be moved only in a direction that is parallel to the film feed.

The object of the invention is to provide a signal which is made possible through the feeding claw and which is given during or at the end of a film step.

SUMMARY OF THE INVENTION

According to the invention, this is achieved in that a lateral edge of the feed slot comprises an offset which, advantageously is associated with the end directed towards the take-up chamber. In this way, the feeding claw is given, during its feeding movement, an additional deflection which is vertical to the latter and which can be used for the control of camera functions, by way of example, a release lock, a counting mechanism, etc. In order to support the additional deflection of the feeding claw, there is preferably provided in the area of the other lateral edge which is opposite to the offset a control surface which is inclined relative to the offset. Depending on special requirements, the feed slot may completely penetrate the bridge; the feed slot may also be designed as a depression which is arranged in the bridge and which is open towards the film.

The invention will be explained in an illustrated and described exemplified embodiment.

DESCRIPTION OF PREFERRED EMBODIMENT

Figure 1:
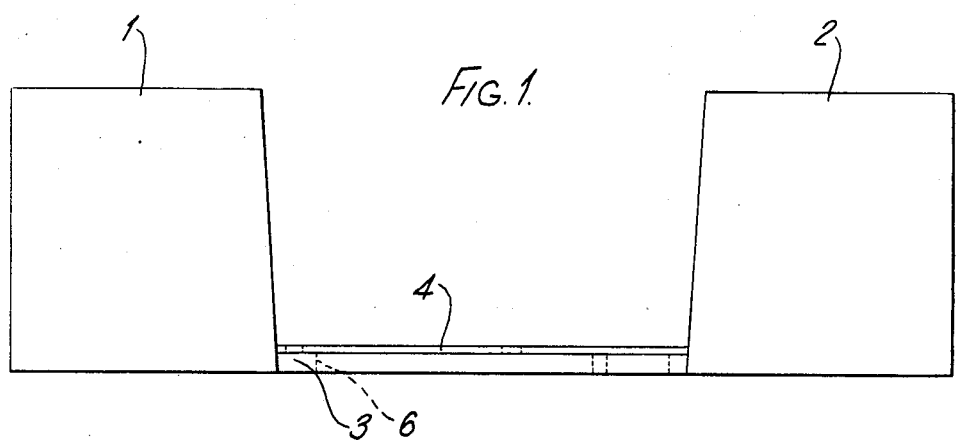
FIG. 1 shows a lateral view of a cassette according to the invention.
Figure 2:
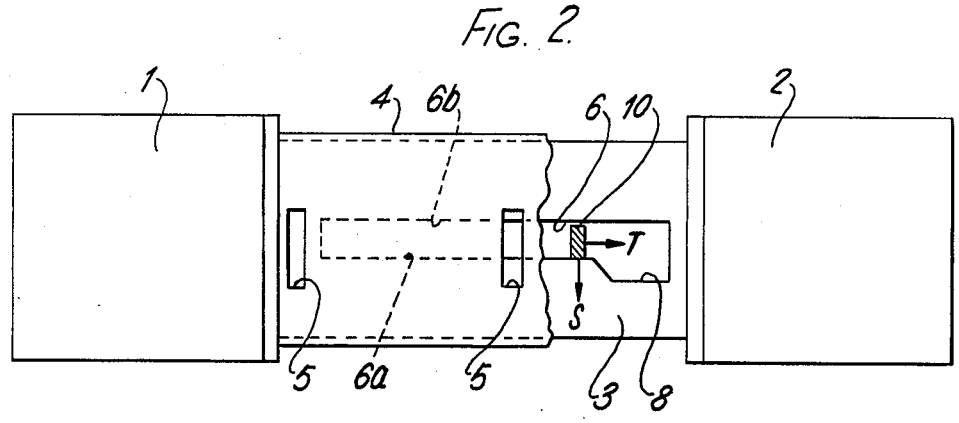
FIG. 2 shows the front of the cassette.

The film cassette (see FIG. 1) consists of the delivery chamber 1 and the take-up chamber 2, which are rigidly connected by the bridge 3. A feed slot 6 is provided in the bridge 3 in the travel direction of the film (see FIG. 2). The width of the feed slot is bounded by the lateral edges 6a and 6b. In the end of the feed slot which is directed towards the take-up chamber 2, the lateral edge 6a comprises an offset 8.

In the delivery chamber 1, there is the spoolless delivery roll of the film 4, whose beginning projects into the take-up chamber 2. The film 4 comprises perforated holes 5, which are spaced in accordance with the film step.

The mode of operation of this design of the feed slot 6 is as follows:

If a feeding claw 10 is rotatably mounted, in addition to its feeding direction T, in the direction of the arrow S, and is loaded with a corresponding spring, then the feeding claw 10 performs, during its feeding movement, an additional lateral movement in the direction of the arrow S. This additional lateral movement can be used for the control of camera switching operations, which are desired, by way of example, as a function of the completed film feed (for example, unlocking of the shutter release, limitation of the feed claw feeding step, etc.)

Figure 3:
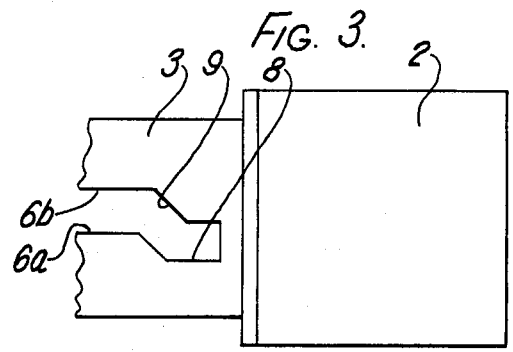
FIG. 3 shows a further development of the feed slot.

According to a further embodiment of the feed slot 6 (see FIG. 3), the end of the other lateral edge 6b, which is situated opposite the offset 8, comprises a control surface 9 which is inclined relative to the offset 8. In this embodiment, the feeding claw 10 does not require a spring which seeks to move it additionally in the direction of the arrow S. Due to the control surface 9, the feeding claw 10 is additionally moved in the direction of the arrow S towards the end of the film feed and can carry out the desired switching operation.

The feed slot 6 may be designed in the bridge 3 of the cassette as an opening or a depression. It is essential that the design of the feed slot 6 is such that the feeding claw 10 has to perform an additional lateral movement.

I claim:

1. A film cassette comprising
   a. a delivery chamber,
   b. a take-up chamber for a film provided with a feed perforation,
   c. a bridge which connects the two chambers,
   d. a feed slot in said bridge extending in the travel direction of the film, a lateral edge of the feed slot having
   e. an offset in the end of the slot directed towards the take-up chamber.

2. A film cassette according to claim 1, wherein a control surface, which is inclined relative to the offset is provided in the area of the other lateral edge which is opposite to the offset.

3. A film cassette according to claim 1, wherein the feed slot penetrates the bridge.

4. A film cassette according to claim 1, wherein the feed slot is designed as a depression arranged in the bridge on the surface of the bridge that is directed towards the film.

* * * * *